No. 862,996. PATENTED AUG. 13, 1907.
E. F. PRICE.
PROCESS OF REDUCING COMPOUNDS AND PRODUCING LOW CARBON FERRO ALLOYS.
APPLICATION FILED NOV. 14, 1905.
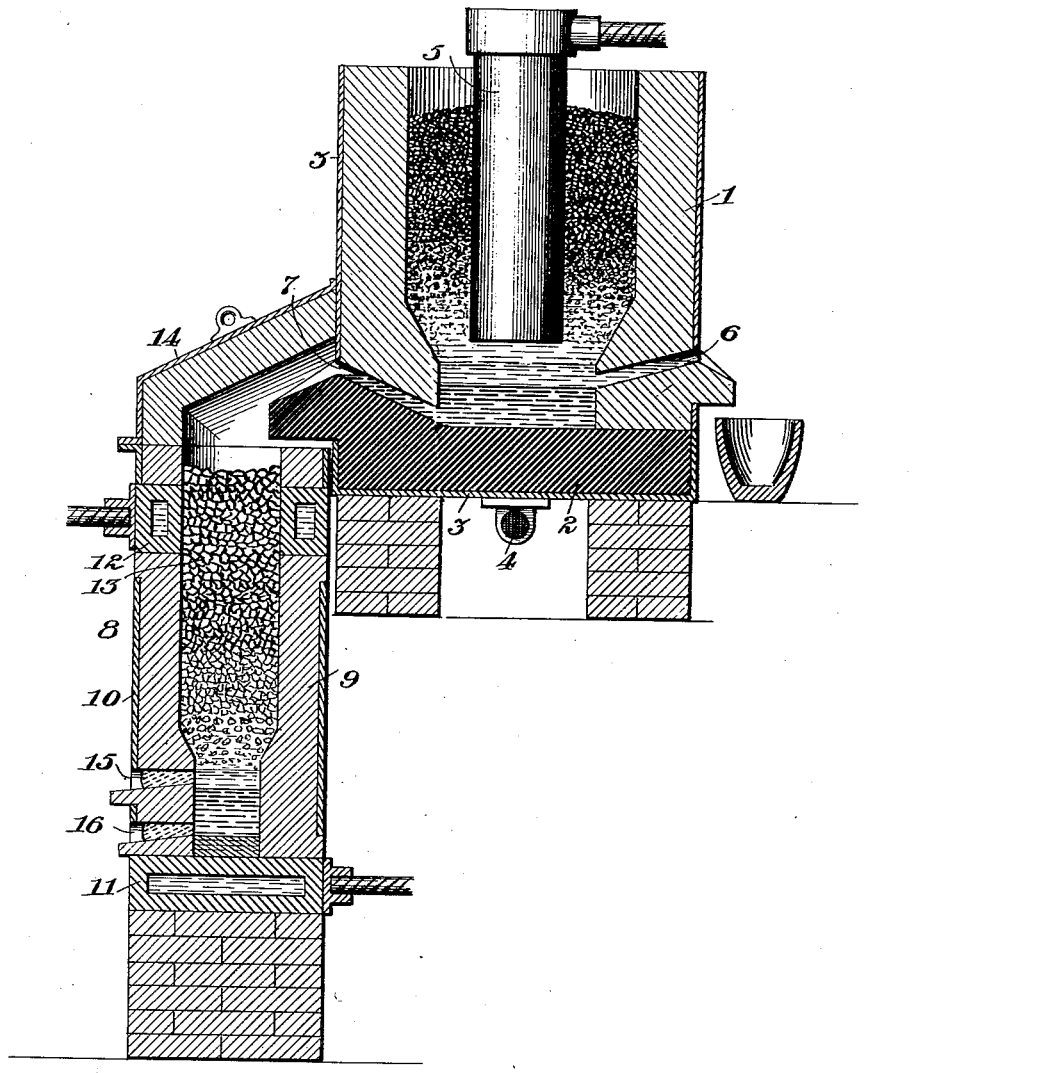
Witnesses:
Geo. E. Garrett
J. B. Hill
Inventor:
Edgar F. Price,
by Byrnes & Townsend,
Attys.

UNITED STATES PATENT OFFICE.

EDGAR F. PRICE, OF NIAGARA FALLS, NEW YORK.

PROCESS OF REDUCING COMPOUNDS AND PRODUCING LOW-CARBON FERRO ALLOYS.

No. 862,996.        Specification of Letters Patent.        Patented Aug. 13, 1907.

Application filed November 14, 1905. Serial No. 287,354.

*To all whom it may concern:*

Be it known that I, EDGAR F. PRICE, a citizen of the United States, residing at Niagara Falls, in the county of Niagara and State of New York, have invented certain new and useful Improvements in Processes of Reducing Compounds and Producing Low-Carbon Ferro Alloys, of which the following is a specification.

This process is designed for the production of low-carbon ferrochromium, ferromanganese, ferrotitanium, ferrovanadium and similar alloys, and contemplates the use of ferrosilicon as a reducing agent. It is possible to electrically produce this silicid with a silicon content of fifty percent and upwards and very low in carbon.

According to the present invention the production of low-carbon ferro-alloys is effected by a continuous operation comprising two stages. In the first stage ferrosilicon high in silicon and low in carbon is produced by electrically smelting a charge of silica, iron ore or iron and carbon. The molten silicid is then tapped from the smelting furnace and percolated through a granular body of the compound to be reduced, for example chromite. The silicon effects the reduction of the oxids of chromium and iron in the charge and the reduced metals alloy with the percolating iron. A basic flux, such as lime, is preferably mixed with the chromite to convert the silica produced by the reduction of oxid ores into a fusible slag. The granular mixture of chromite or other ore and lime is preferably heated by interposing the mixture as a resistance-conductor in an electric circuit, both the heated charge and the percolating metal serving to carry the electric current.

Suitable apparatus for carrying out the process is shown in the accompanying drawing, in which the figure is a transverse vertical section of an electric-arc smelting-furnace for producing the silicid, and an electric-resistance furnace for utilizing the silicid to effect reduction.

The arc smelting-furnace comprises sides 1 of refractory non-conductive material, such as carborundum, siloxicon or silica, or of carbon, and a hearth 2 of carbon, the sides and hearth being inclosed in a metal casing 3 having an electric terminal 4. The carbon hearth constitutes one electrode. The other electrode is a depending carbon rod 5. Tap-holes 6, 7 for slag and metal extend through the side walls at different heights.

In using this furnace to carry out the first stage of the process, an arc is established between the depending electrodes and the carbon hearth, and the charge, for example a mixture of finely ground silica, iron ore and coke, the silica and carbon preferably being in relatively large amount, is fed into the furnace. As the charge is reduced, ferrosilicon collects in the bottom of the furnace and runs out through the tap-hole 7 into the resistance-furnace 8.

The furnace 8 comprises a vertical annular body 9 of refractory electrically - non - conductive material, preferably chromite or lime, surrounded by a metal casing 10. Beneath the body is a metal hearth 11, preferably a water-cooled steel casting, which serves as one electrode. A water-cooled metal ring 12, arranged in the walls of the chamber near its upper end, serves as the other electrode. The chamber is filled with a granular mixture 13 of the ore, for example chromite, and a basic flux, such as lime, the charge being supported by the metal hearth 11 and lying in contact with the inner surface of the metal ring 12. A removable heat-retaining hood 14 incloses the upper end of the resistance furnace and the metal-outlet of the arc-furnace. Tap-holes 15, 16 for the silicate slag and ferro-alloy extend through the lower end of the chamber 8.

In the second stage of the process, the charge 13 in the chamber 8 is initially raised to a high temperature, as by passing hot products of combustion through it, and the silicid flowing from the tap-hole 7 of the arc-furnace is delivered upon the upper end of the granular body and percolates slowly through it. The silicon reacts on the oxids of the charge and the reduced chromium and iron alloy with the percolating iron, substantially all of the silicon being eliminated. The silica combines with the lime to produce a fusible slag. The slag and ferro-alloy collect in the lower end of the chamber, are allowed to stratify and withdrawn through the tap-holes 15, 16.

In order to maintain the charge in the chamber 8 at a high temperature, an electric current is passed between the metal hearth 11 and the metal ring 12 and through the granular charge and the percolating metal therein, serving as a resistance-conductor.

This process enables a ferro-alloy containing a minimum or predetermined low percentage of carbon to be continuously produced at a relatively low cost, the use of a charge containing a relatively large amount of silica and carbon producing a silicid high in silicon and low in carbon and serving as an effective reducing agent.

An incandescence furnace may be used to carry out the first stage of the process, and the charge, if of sufficiently high conductivity, may constitute a resistance conductor.

The term "molten reducing agent high in silicon", as used in the claims, refers to silicids and ferrosilicon, as distinguished from pig-iron which usually contains a small percentage of silicon, with other metalloids.

I claim:—

1. The process of reducing refractory compounds, which consists in percolating a molten reducing agent essentially comprising a highly-oxidizable element through a granular body of the compound, as set forth.

2. The process of reducing refractory compounds, which consists in percolating a molten reducing agent high in silicon through a granular body of the compound, as set forth.

3. The process of reducing refractory compounds, which consists in percolating a molten reducing agent essentially comprising a highly-oxidizable element through a granular heated body of the compound, as set forth.

4. The process of reducing refractory compounds, which consists in percolating a molten reducing agent high in silicon through a granular heated body of the compound, as set forth.

5. The process of reducing oxidized metallic compounds, which consists in percolating a molten reducing agent containing silicon through a granular body of the compound and a basic flux, as set forth.

6. The process of reducing metallic compounds, which consists in heating a body of the compound by interposing the body as a resistance conductor in an electric circuit, and percolating through the heated body a molten reducing agent, as set forth.

7. The process of reducing metallic compounds, which consists in heating a body of the compound by interposing the body as a resistance conductor in an electric circuit, and percolating through the heated body a molten reducing agent containing silicon, as set forth.

8. The process of reducing oxidized metallic compounds, which consists in heating a mixture of the compound and a basic flux by interposing a body of the mixture as a resistance conductor in an electric circuit, and percolating through the heated body a molten reducing agent containing silicon, as set forth.

9. The process of producing ferro-alloys, which consists in percolating molten ferrosilicon through a granular heated body of a compound of a metal reducible by silicon and alloyable with iron, as set forth.

10. The process of producing ferro-alloys, which consists in percolating molten ferrosilicon through a heated mixture of an oxidized compound of a metal reducible by silicon and alloyable with iron, and a basic flux, as set forth.

11. The process of producing ferro-alloys, which consists in electrically heating a compound of a metal reducible by silicon and alloyable with iron, by interposing a body of the compound as a resistance conductor in an electric circuit, and percolating molten ferrosilicon through the heated body, as set forth.

12. The process of producing ferro-alloys, which consists in electrically heating a mixture of an oxidized compound of a metal which is reducible by silicon and alloyable with iron, and a basic flux, by interposing a body of the mixture as a resistance conductor in an electric circuit, and percolating molten ferrosilicon through the heated body, as set forth.

13. The process of producing low-carbon ferro-alloys, which consists in producing molten ferrosilicon high in silicon and low in carbon by electrically smelting a charge containing silica, carbon and a source of iron, the silica and carbon being in relatively large amount, heating a body of a compound of a metal reducible by silicon and alloyable with iron by interposing the body as a resistance conductor in an electric circuit, and percolating the molten ferrosilicon through the heated body, as set forth.

14. The process of producing low-carbon ferro-alloys, which consists in producing molten ferrosilicon high in silicon and low in carbon by electrically smelting a charge containing silica, carbon and a source of iron, the silica and carbon being in relatively large amount, heating a mixture of an oxidized compound of a metal reducible by silicon and alloyable with iron, and a basic flux, by interposing a body of the mixture as a resistance conductor in an electric circuit, and percolating molten ferrosilicon through the heated body, as set forth.

In testimony whereof, I affix my signature in presence of two witnesses.

EDGAR F. PRICE.

Witnesses:
G. E. Cox,
D. Burgess.